3,619,829
Patented Nov. 16, 1971

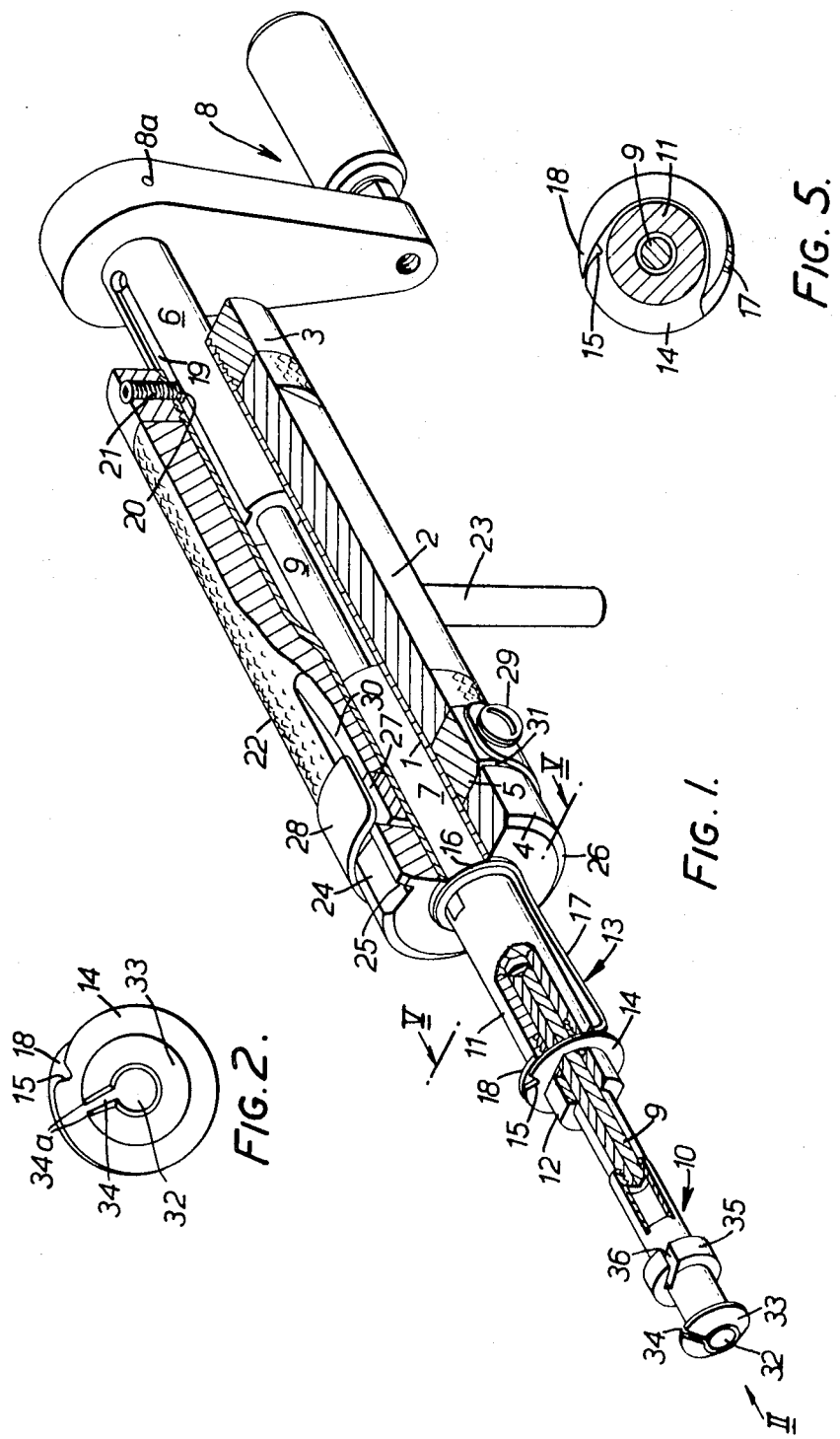

3,619,829
WIRE WRAPPING TOOLS
Frederick George Finn, Sevenoaks, and Charles John Gaut, Morden, England, assignors to The Post Office, London, England
Filed Sept. 16, 1969, Ser. No. 858,276
Claims priority, application Great Britain, Sept. 17, 1968, 44,076/68
Int. Cl. B25f 1/00; H02g 1/12; B21f 3/00
U.S. Cl. 7—14.1                                9 Claims

ABSTRACT OF THE DISCLOSURE

A wire wrapping tool comprising a wrapping head mounted upon a driving shaft and an insulation stripper device mounted upon tubular means through which the driving shaft passes. The insulation stripper is slidable axially upon the driving shaft thereby enabling a wire to be stripped of insulation before the wire is wrapped.

BACKGROUND OF THE INVENTION

This invention relates to wire wrapping tools, and has particular, but not exclusive, reference to wire wrapping tools for use with lightweight wire.

Lightweight wire, for example Standard Wire Gauge No. 32, is extremely difficult to strip and wrap to form a wrapped joint by using known tools. This is because conventional tools strip and wrap the wire at the same time and this imposes too large a stress on the wire, which consequently breaks. This is especially true of polythene insulated wire since the polythene insulant tends to "concertina" when the insulation is pulled along the wire. This causes the grip of the insulation to tighten on the wire and the pull on the wire of the insulation stripper combined with the pull on the wire by the wrapping portion of the tool break the wire.

SUMMARY OF THE INVENTION

The present invention provides a wire wrapping tool comprising insulation stripping means, and a wire wrapping portion disposed on a driving member and having a longitudinal hole to receive a component to be wrapped or each of two components to be secured together by means of a wrapped joint, the insulation stripping means being movable relative to the wire wrapping portion.

The insulation stripping means is longitudinally with respect to the wire wrapping portion and there may be provided a wire cutter to cut the wire. The distance between the insulation stripping means and the wire cutter may be adjustable.

The wire wrapping portion may include a further insulation stripping means, and a wire support means may be provided between the insulation stripping means and the further insulation stripping means.

The driving member may comprise a rod. The insulation stripping means may be secured to a first tube coaxial with, and surrounding the driving member, the first tube being movable longitudinally with respect to the driving member but being constrained so that rotation of the driving member causes rotation of the first tube.

There may be provided a handling cylinder co-axial with and surrounding the first tube, the handling cylinder being freely rotatable about the first tube, but being constrained from longitudinal movement with respect to the first tube. The wire cutter may comprise a first portion secured to the first tube, and a second portion secured to the handling cylinder, the two portions forming the two parts of a guillotine.

The insulation stripping means may comprise a cantilever-mounted spring having at its free end a knife portion, and a disc in incising relationship with the knife portion. The fixed end of the spring may be clamped between a second tube extendable from the first tube, to which the second tube may be adjustably secured, and a third tube, and the disc may be clamped between a hollow bolt and the third tube.

BRIEF DESCRIPTION OF THE DRAWING

FIG. 1 is a perspective view, partly in section, of the tool,
FIG. 2 is a view along the arrow II of a part of FIG. 1,
FIGS. 3 and 4 are views of the tool in position on a tag,
FIG. 5 is a part sectional view along the line V—V of FIG. 1.

DESCRIPTION OF THE PREFERRED EMBODIMENT

Figure 3:
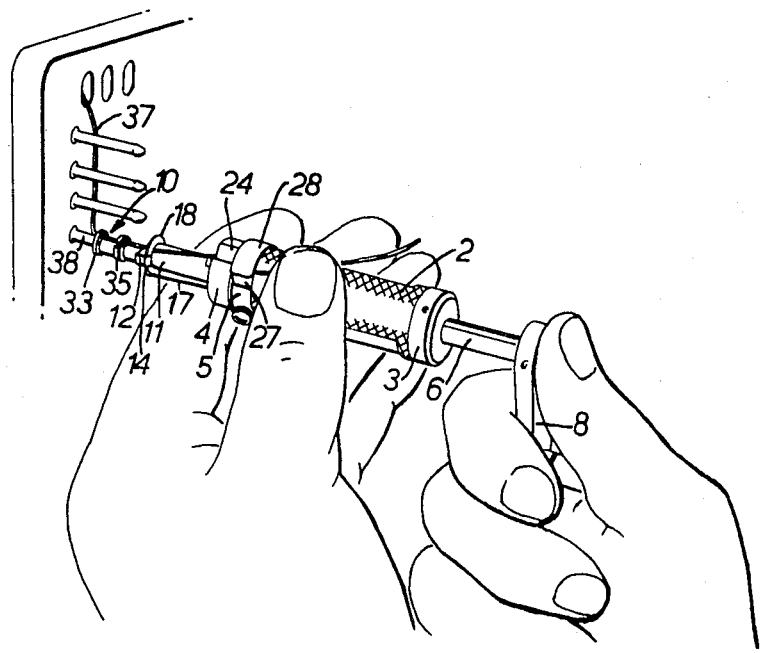

The wire wrapping tool is provided with a first tube 1 about which is rotatable a handling cylinder 2. Screwed on to one end of the tube 1 is a collar 3, a second collar 4 being an interference fit on the other end of the first tube 1. Secured to and rotatable with the handling cylinder 2 is a third collar 5. Inserted into one end of the first tube 1 is a slidable tube 6 and inserted into the other end of the first tube 1 is a second tube 7 adjustably extendable from that tube as described below. The other end of the slidable tube 6 carries a handle 8. Passing through the slidable tube 6 and the second tube 7 is a rod 9 which is secured at one end to handle 8 and to the slidable tube 6 by means of a grub screw 8a. The other end of the rod 9 carries a wire wrapping and insulation stripping head 10. The second tube 7 is clamped to the first tube 1 and the second collar 4 by grub screws, (not shown). Screwed onto the second tube 7 is a third tube 11 and screwed into the third tube 11 is a hollow bolt 12. Clamped between the second tube 7 and the third tube 11 is a cantilever-mounted spring 13. Clamped between the third tube 11 and the hollow bolt 12 is a disc 14 which has a notch 15 cut in its perimeter. The spring 13 is made up of a washer portion 16, a longitudinal member 17 and knife portion 18. The knife portion 18 co-operates with the notch 15 to form an insulation stripper, further details of which are given below.

The slidable tube 6 has a groove 19, into which is screwed a lower grub screw 20. The lower grub screw 20 is screwed through the first tube 1 and the first collar 3 until it touches the floor of the groove 19, the screw is then withdrawn by an amount sufficient to allow the slidable tube 6 to move longitudinally past the lower grub screw 20, but not to rotate within the tube. The lower grub screw 20 is locked in position by an upper grub screw 21.

Rotation of the handle 8 carries with it the rod 9, the slidable tube 6, the first tube 1, the first collar 3 and the second collar 4. The second tube 7 is secured to the second collar 4 by means of grub screws (not shown). Thus rotation of the handle 8 also causes rotation of the second tube 7, the third tube 11, the hollow bolt 12, the spring 13 and the disc 14. The handling cylinder 2 is provided with a knurled surface 22 and a short rod 23 which enable the handling cylinder to be held against rotation when the handle 8 is turned.

The second collar 4 has a portion 24 removed from its rim which portion ends in a wall 25. The edge of the second collar 4 is chamfered as at 26.

The third collar 5 also has a portion 27 removed from its rim which ends in a wall which faces the wall 25. The wall on the third collar 5 is masked in the drawings by a spring clip 28 which is secured to the third collar 5 by the screw 29. A parallel sided groove 30 is formed in the surface of the handling cylinder 2; at one end its floor slopes up to surface of the handling cylinder, and at the other end it opens into the removed portion 27 of the collar 5. One edge 31 of the third collar 5 is chamfered in a similar manner to the edge 26 of the second collar 4.

The wire wrapping and insulation stripping head 10 is basically in the form of a tube with a longitudinal bore 32. At the outer end of the longitudinal bore 32 is a frusto-conical portion 33 which has a slit 34 cut through the frusto-conical poriton, the edges of the slit being chamfered as at 34a. Along the length of the head 10 there is an integral collar 35 which has a slot 36 cut into it.

The overall arrangement of the tool can now be explained. The slidable tube 6 is movable longitudinally within the first tube 1, and carries with it the handle 8, the rod 9, and the wire wrapping and insulation stripping head 10 only. This motion is limited in one direction by the handle 8 abutting the first collar 3, and in the other direction by the wire wrapping and insulation stripping head 10 abutting the hollow bolt 12. Rotation by the handle 8 of the slidable tube 6 also carries with it the rod 9 and the head 10, and in addition causes rotation of the first collar 3, the first tube 1, the second collar 4, the second tube 7, the third tube 11, the hollow bolt 12, the spring 13 and the disc 14.

The second tube 7 may be secured to the first tube 1 in any one of a plurality of longitudinal positions by releasing the clamping grub screws which pass through the second collar 4 and the tube 1, pushing the second tube 7 in or out, and retightening the clamping grub screws. It is obvious that repositioning the second tube 7 will, by altering the position of the hollow bolt 12 with respect to the first collar 3, alter the longitudinal travel of the rod 9 and the head 10 relative to the handling cylinder 2.

Figure 4:
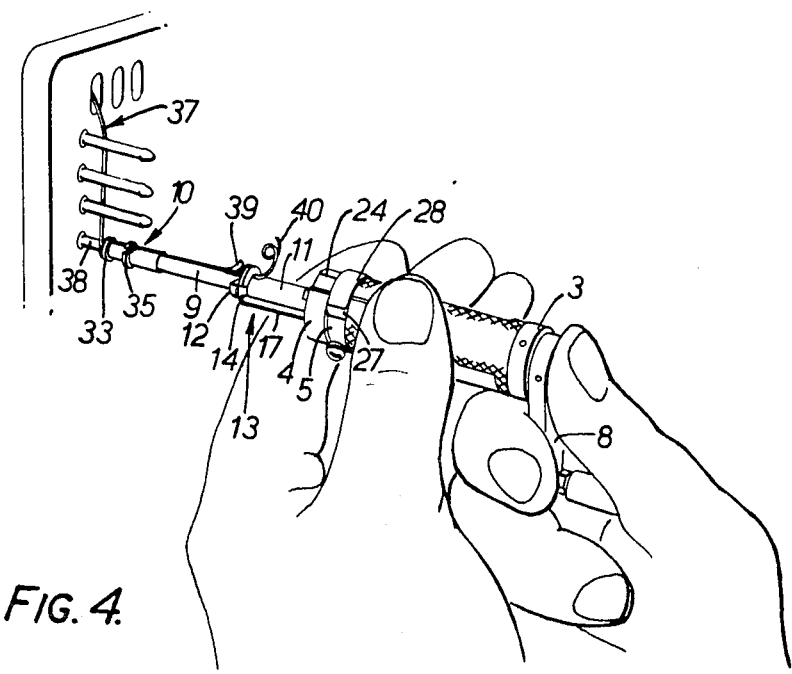

The operation of the tool, including the wire cutting and stripping, will now be described with especial reference to FIGS. 1, 3 and 4. A sufficient length of the insulated wire to be cut, stripped and wrapped is brought down on the right hand side of the tag 38, around which it is to be wrapped, passed beneath the tag and up on the left hand side, as the tool is pushed onto the tag 38. The handling cylinder is pushed to the left (as seen in FIG. 3) until the head 10 abuts the hollow bolt 12. The wire is pushed into the slit 34 and caught in the slot 36. The longitudinal portion 17 of the spring 13 is pushed upwards (as seen in FIG. 3) so that the knife portion 18 is lifted clear of the notch 15, the wire 37 is placed in the notch 15 and the spring is released, bringing the knife portion 18 down on top of the wire. The knife 18 makes an incision into the insulation of the wire 37. The end of the wire is inserted under the spring clip 28 to lie in the gaps 24 and 27.

The handling cylinder 2 is held steady, and the handle 8 is rotated in a clockwise direction, rotating the second collar 4 relative to the third collar 5 by an amount just sufficient to shear the wire 37 between the wall 25 on the collar 4 and the wall (not shown) on the collar 5. After the wire has been sheared, the wire wrapping head 10 is held on the tag by thumb pressure on the back of the handle 8, and the handling cylinder 2 is slid back from the tag until it abuts the handle 8, as shown in FIG. 4. As the cylinder 2 moves back, it carries with it the disc 14 and the knife portion 18, which, between them, grip the insulation but not the conductor of the wire. The insulation is thus stripped from the wire as the cylinder 2 moves back. The force which is applied to the wire by the stripping action tends to stretch the wire by a small amount, and strips the insulation completely from the wire. The handling cylinder 2 must be able to move a distance greater than the distance between the disc 14 and the shearing mechanism of the two collars 4 and 5. Having stripped the insulation from a part of the wire, the tool will be in the position shown in FIG. 4, with the end of 39 of the wire separated from the stripped insulation 40.

To wrap the wire round the tag the handle 8 is rotated in a clockwise direction so that the wire wrapping and insulation stripping head will carry and wrap the wire round the tag. The slit 34 through which the wire passes strips the small portion of the insulation which remains on the wire between the slit 34 and the disc 14 in its forward position (i.e. as shown in FIG. 3). This portion of the insulation is held by the walls of the slit 34 while the conductor passes through the slit. As the wire is wrapped around the tag, the coil of wire already wrapped onto the tag gradually pushes the tool back off the tag so that the wire is deposited in a single layer helix, and the tool pulls the small remaining portion of insulation with it. When all the wire has been wrapped around the tag, the tool is removed prior to making a further wrapped joint.

The basic tool, as described above, may be modified in several ways. The spring clip 28 which is shown attached to the third collar 5, may be attached to the second collar 4, in which case it could be turned round so that it extended over the wall 25 and into the removed portion 24, ending within the removed portion. In this arrangement, the clip still retains the wire after it has been sheared to length and prior to stripping. In addition, the clip retains the stripped insulation until it is pulled out.

When wrapping wire in which the conductor is not tinned but is heated before extrusion of the polythene insulant, it is sometimes found that the slit 34 is not capable of removing the insulation without breaking the wire. This is because the surface of the conductor has been partially oxidised by the heating prior to extrusion, and the insulant forms an extremely strong bond with the conductor. The enable wire of this type to be wrapped the tool can be formed so that the stripping and wire wrapping functions of the tool are completely separate operations and all the insulation which is to be removed is stripped in one operation.

Figure 6:
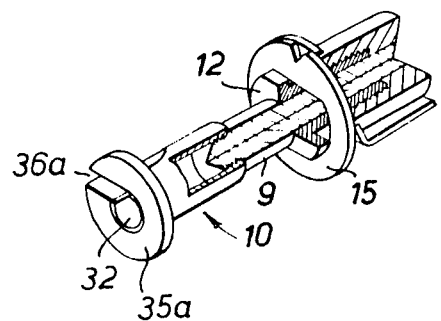
FIG. 6 is a part sectional view of a further tool.

In a tool of this type, those parts of the head which lie to the left of the collar 35 (as seen in FIG. 1) are dispensed with, leaving only the collar 35a (FIG. 6) which may be formed with a frusto-conical portion similar to that of the portion 33. There is no slit corresponding to 34, but a slot 36a is provided similar to slot 36 (FIG. 1) except that its entrance faces in the opposite direction. That part of the head 10 lying behind collar 35a is made as short as possible, as is the head of bolt 12, so that disc 14 can be brought very close to slot 36a. Thus the stripper when it is moved back during operation of the tool will strip most of the insulation, leaving the smallest possible length on the portion of the wire which is to be wrapped. This small length although wrapped around the tag does not prevent a good joint being made.

The tools as described make no provision for adjusting the depth to which the tag enters their longitudinal bores 32. Adjustable stops may be incorporated which would comprise further rods passing through the centres of the rods 9, and protruding from the centres of the handle ends of the rods.

We claim:

1. A device for making electrical connections by means of wrapped joints comprising in combination:
   (a) a driving shaft,
   (b) a wire wrapping head mounted at one end of said driving shaft,
   (c) tubular means mounted upon said driving shaft for longitudinal movement along said shaft relative to said head, and,
   (d) an insulation stripping means mounted upon said tubular means, said means comprising a wire receiving notch positioned in a stationary first members of said stripping means, a cutting surface means moveably mounted on a second member thereof, said members being mounted in slideable surface contact with each other on said tubular means, and spring means for sliding said second members relative to said first member into a first open position of said cutting surface means, and for biassing said cutting surface means into a second closed position of operative engagement with said notch for cutting the insulation.

2. A device as claimed in claim 1 and further comprising:
(e) locking means on said tubular means for locking said means to said driving shaft for rotary movement with said shaft.

3. A device as claimed in claim 1 in which said biassing means comprises a spring member mounted cantilever fashion on said tubular means, said cutting surface means being carried by said spring members.

4. A device as claimed in claim 1 in which said tubular means comprises a first tubular portion, an extension secured to said first tubular portion so as to extend coaxially from said portion, said insulation stripping device being mounted upon said extension.

5. A device as claimed in claim 4 in which said extension comprises a second tubular portion secured to said first portion in adjustable telescopic relationship, a third tubular portion fixed to said second portion and a bolt screwed axially into said third portion, in which said biassing means comprises a spring member secured cantilever fashion between said second and third tubular portions, and in which said cutting surface means comprises a disc secured concentrically to said third portion by said bolt.

6. A device as claimed in claim 1 and further comprising:
(f) a cylindrical handle mounted coaxially on said tubular means and rotatable relatively thereto, and,
(g) means for constraining said handle against longitudinal movement relatively to said tubular means.

7. A device as claimed in claim 6 and further comprising:
(h) a wire cutter having a first part secured to said tubular means and a second part secured to said cylindrical handle.

8. A device as claimed in claim 1 and further comprising:
(i) wire support means mounted upon and fixed to said driving shaft adjacent said wire wrapping head.

9. A device as claimed in claim 1 and further comprising:
(j) an insulation stripping groove in said wire wrapping head.

References Cited
UNITED STATES PATENTS

| | | | |
|---|---|---|---|
| 2,696,656 | 12/1954 | Madden | 29—203 |
| 2,743,502 | 5/1956 | Reck | 140—122 |
| 2,885,764 | 5/1959 | Shulters et al. | 29—203 |

RICHARD J. HERBST, Primary Eaminer

E. M. COMBS, Assistant Examiner

U.S. Cl. X.R.

81—9.5; 140—124